United States Patent [11] 3,613,871

[72] Inventor Thomas H. Evans
265 Briarcroft Road, Claremont, Calif. 91711
[21] Appl. No. 47,729
[22] Filed June 19, 1970
[45] Patented Oct. 19, 1971

[54] STORAGE CASE FOR ARTICLES SUCH AS TAPE CARTRIDGES
6 Claims, 5 Drawing Figs.

[52] U.S. Cl. 206/1 R, 206/45.19, 206/65 R, 217/18, 217/35, 229/3.5 R, 229/14 C, 312/245
[51] Int. Cl. A45c 11/00, B65d 5/50, B65d 85/67
[50] Field of Search 206/1, 45.19, 65, 46 FC, 46 FR; 217/25.5, 18, 34, 35, 53, 3.5 R; 229/15, 14 C; 312/245; 224/429; 220/20

[56] References Cited

UNITED STATES PATENTS

| | | | |
|---|---|---|---|
| 1,926,916 | 9/1933 | Reeves | 217/25.5 |
| 2,747,732 | 5/1956 | Fischer | 206/65 |
| 3,084,788 | 4/1963 | Ford | 206/17 |
| 3,113,689 | 12/1963 | Moussong | 206/65 A |
| 3,236,366 | 2/1966 | Broda et al. | 150/52 |
| 3,443,851 | 5/1969 | Earl | 312/245 |

*Primary Examiner*—William T. Dixson, Jr.
*Attorney*—Boniard I. Brown

ABSTRACT: A storage case for magnetic tape cartridges. The storage case has an outer container with an inner resilient bottom pad and an inner cartridge holder fashioned from sheet stock which is folded to provide a platform having depending flanges along its edges for supporting the platform in spaced parallel relation above the pad. The holder platform is slotted to snugly receive the tape cartridges in spaced side-by-side relation with the transcribing ends of the cartridges, i.e., the cartridge ends along which extend the exposed runs of cartridge tape, resting on the resilient pad to prevent entrance of dust into the cartridges and shield the exposed tape runs against overheating.

INVENTOR
THOMAS H. EVANS
BY
Bernard J. Brown
ATTORNEY

STORAGE CASE FOR ARTICLES SUCH AS TAPE CARTRIDGES

BACKGROUND OF THE INVENTION

1. Field of the Invention

This invention relates generally to storage cases and more particularly to a storage case for magnetic tape cartridges.

2. Prior Art

Magnetic tape cartridges and magnetic tape cassettes, referred to herein as cartridges, are gaining ever increasing popularity in the field of recorded music for home entertainment. While such cartridges are convenient to use, they present one problem to which the present invention is addressed. This is the problem of storage of the cartridges when not in use. The ideal cartridge storage facility must satisfy certain requirements. Foremost of these requirements are the ability to hold the cartridges in spaced relation firmly without damage or interference with removal and insertion of the cartridges, and the ability to shield the cartridges against entrance of dust and the exposed cartridge top runs against overheating.

SUMMARY OF THE INVENTION

The present invention provides a cartridge storage case which satisfies the above and other requirements of an ideal storage case. The storage case has an outer container with an inner resilient bottom pad and an inner cartridge holder. This holder is fashioned from sheet stock, such as so-called "chipboard" (cardboard covered with plastic sheets), which is folded to provide a platform with depending flanges along its edges for supporting the platform in spaced parallel relation above the bottom pad. The platform has spaced slots for snugly receiving tape cartridges in vertical, spaced side by side relation with the lower ends of the cartridges resting on the bottom pad. Preferably, the cartridges are inserted into the holder platform slots transcribing end first, that is the cartridge end along which extends the exposed run of cartridge tape. When the cartridges are inserted in this manner, the bottom pad not only cushions the cartridges but also seals the cartridges against dirt and dust and shields the exposed tape runs against dirt, dust, and overheating.

DESCRIPTION OF THE PREFERRED EMBODIMENT

Figures 1, 2, 3, 4, 5:
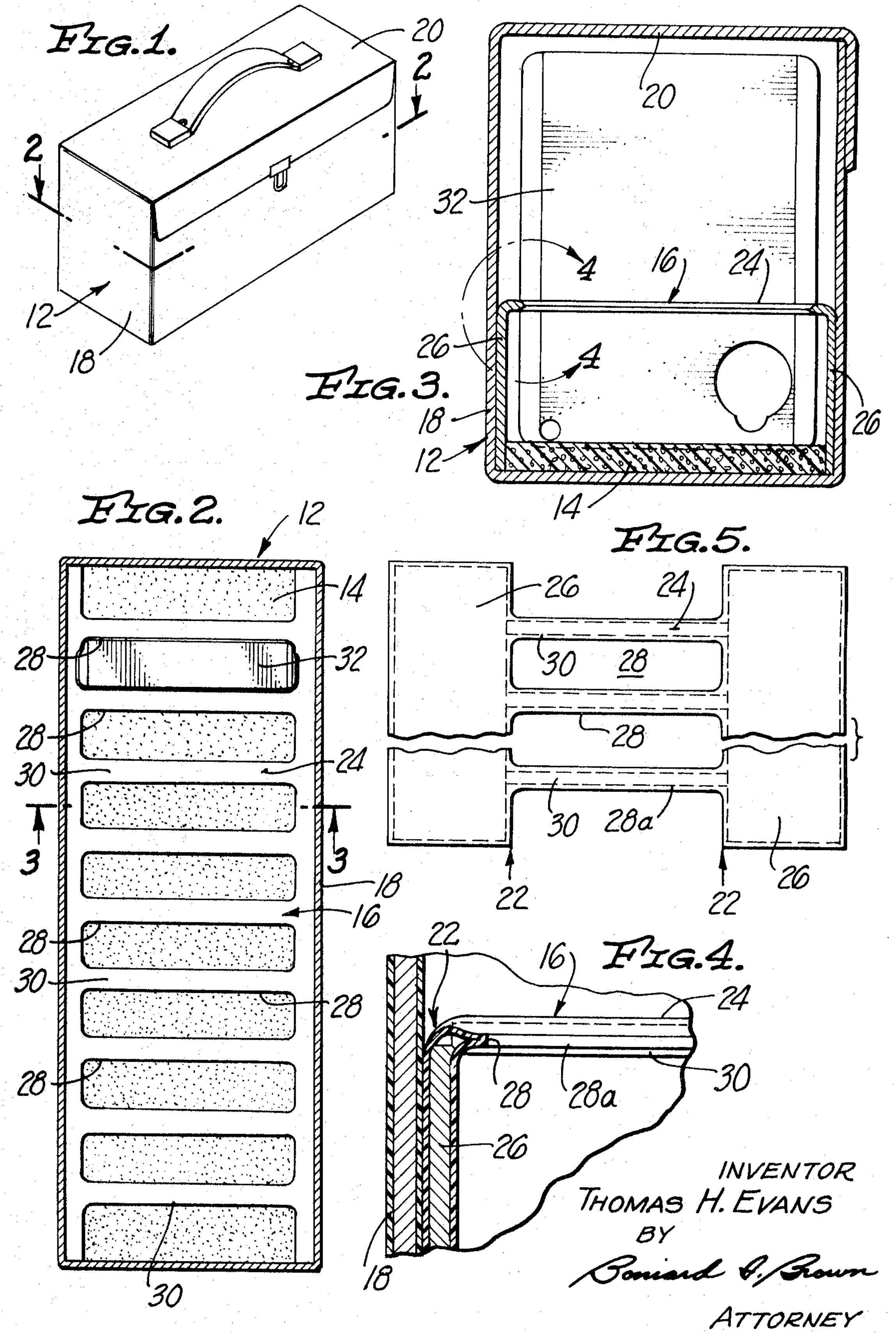
FIG. 1 is a perspective view of a present tape cartridge storage case.
FIG. 2 is an enlarged section taken on line 2—2 in FIG. 1.
FIG. 3 is a section taken on line 3—3 in FIG. 2.
FIG. 4 is an enlargement of the area 4—4 in FIG. 3.
FIG. 5 is a plan view of the cartridge holder before folding.

The tape cartridge storage case 10 illustrated in the drawings has an outer container 12 with an inner resilient bottom pad 14 and a cartridge holder 16. Container 12 is a box having a bottom portion 18 and a hinged cover 20. The box may be constructed of plastic covered cardboard with padding added, if desired to enhance appearance. Bottom pad 14 is a piece of foam rubber or other resilient material which is shaped to fit within and rest on the bottom wall of the container. If desired, the pad may be bonded or otherwise fixed to the bottom wall.

The construction of the cartridge holder 16 constitutes a major contribution of the invention. This holder is fashioned from relatively thin though stiff sheet stock, such as so-called "chipboard." Such chip board comprises a sheet of cardboard covered with plastic sheets. According to the invention, the holder 16 is formed by folding the holder sheet stock along parallel fold lines 22 to provide a platform 24 with depending flanges 26 along two of its opposite edges. The holder is dimensioned so that when thus folded, it fits snugly within the container 12 with the flanges 26 resting on the bottom wall of the container to locate the platform 24 in spaced parallel relation above the pad 14. As shown in FIG. 3, the pad bears edgewise against the holder flanges to retain the flanges in contact with the adjacent container sidewalls. These sidewalls support the flanges against buckling.

Formed in the holder platform 24 are a number of slots 28. These slots extend normal to the holder flanges 26 and define intervening ribs 30. The slots are dimensioned to snugly receive magnetic tape cartridges 32 which are inserted edgewise through the slots; as shown. In this regard, a feature of the cartridge holder 16, when constructed of "chip board" resides in the fact that the outer plastic sheets are sealed to one another about the edges of the slots 28 in a manner which defines flexible though relatively stiff plastic lips 28*a* about slots 28. These lips yield to receive and then firmly grip the cartridges. When a number of cartridges are placed in the cartridge holder 16, the cartridges are vertically disposed in spaced side-by-side relation with the lower ends of the cartridges resting on the bottom pad 14. Preferably, the cartridges are inserted into the holder transcribing end first, that is the end along which extends the exposed run of cartridge tape. When the cartridges are inserted in this way, the bottom pad not only cushions the cartridges but also seals the cartridges against the entrance of dirt and dust and shields the exposed tape runs against overheating as a result of higher than normal ambient temperatures.

I claim:

1. A storage case for generally rectangular tape cartridges having an exposed run of magnetic tape along one cartridge edge, comprising:

an outer generally rectangular container having a bottom wall, upstanding sidewalls rising from the edges of said bottom wall, and a cover, a cartridge holder within said container including a platform above and parallel to said bottom wall and flanges depending from edges of said platform into contact with said bottom wall to support said platform on and in spaced relation above said bottom wall, a resiliently compliant pad supported on said bottom wall below said platform and having a normally generally flat upper surface facing said platform, and said platform having parallel slots disposed side by side for receiving said cartridges in storage positions wherein said cartridge edges rest on said pad to cushion the cartridges, seal the latter against entrance of dirt, and shield the exposed tape runs against dirt and overheating.

2. A storage case according to claim 1 wherein:

said holder flanges bear flat against the inner surfaces of the adjacent container sidewalls, and said pad is located between and bears edgewise against said flanges to hold the flanges in contact with the adjacent container sidewalls.

3. A storage case according to claim 2 wherein:

said holder is constructed of laminated sheet material including an inner reinforcing layer and outer sheet plastic layers which are bonded to one another along the boundaries of said holder slots to form resilient cartridge gripping lips about each slot.

4. In combination:

a generally rectangular magnetic tape cartridge having an exposed run of magnetic tape along one cartridge edge and a storage case for said cartridge, said case comprising an outer generally rectangular container having a bottom wall, upstanding sidewalls rising from the edges of said bottom wall, and a cover, a cartridge holder within said container including a platform above and parallel to said bottom wall and flanges depending from edges of said platform into contact with said bottom wall to support said platform on and in spaced relation above said bottom wall, a resiliently compliant pad supported on said bottom wall below said platform and having a normally generally flat upper surface facing said platform, and said platform having a slot snugly receiving said cartridge in a storage position wherein said cartridge edge rests on said pad to cushion the cartridge, shield the cartridge against entrance of dirt, and shield the exposed tape run against dirt and overheating.

5. The combination according to claim 4 wherein:

said holder flanges bear flat against the inner surfaces of the adjacent container sidewalls, and said pad is located between and bears edgewise against said flanges to hold the flanges in contact with the adjacent container sidewalls.

6. The combination according to claim 5 wherein:

said holder is constructed of laminated sheet material including an inner reinforcing layer and outer sheet plastic layers which are bonded to one another along the boundaries of said holder slot to form resilient cartridge gripping lips about said slot.